United States Patent [19]
Porter et al.

[11] 4,257,124
[45] Mar. 17, 1981

[54] OPTICAL REPEATER FOR USE IN ACTIVE MULTIPORT FIBER OPTIC DATA BUS COUPLER

[75] Inventors: David R. Porter, Seattle; Irving R. Reese, Bellevue; Greg J. Von Bokern, Kent, all of Wash.

[73] Assignee: The Boeing Company, Seattle, Wash.

[21] Appl. No.: 26,376

[22] Filed: Apr. 2, 1979

[51] Int. Cl.³ .................................................. H04B 9/00
[52] U.S. Cl. ................................. 455/601; 350/96.15; 350/96.16; 455/602; 455/612
[58] Field of Search ................... 250/199; 350/96.15, 350/96.16; 455/601, 602, 612

[56] References Cited

U.S. PATENT DOCUMENTS

| | | | |
|---|---|---|---|
| 3,936,141 | 2/1976 | Milton | 350/96.16 |
| 3,968,361 | 7/1976 | Bumgardner | 250/199 |
| 4,012,633 | 3/1977 | Huntley | 250/199 |
| 4,017,149 | 4/1977 | Kao | 350/96.16 |
| 4,027,153 | 5/1977 | Käch | 250/227 |
| 4,062,043 | 12/1977 | Zeidler | 250/199 |
| 4,095,097 | 6/1978 | Reeve | 250/199 |
| 4,121,095 | 10/1978 | Endersz | 250/199 |
| 4,156,134 | 5/1979 | Minner | 250/199 |
| 4,166,212 | 8/1979 | Judeinstein | 350/96.16 |
| 4,166,946 | 9/1979 | Chown | 350/96.16 |

Primary Examiner—Howard W. Britton
Attorney, Agent, or Firm—Conrad O. Gardner; B. A. Donahue

[57] ABSTRACT

A coupler utilizing a repeater. Dedicated transmit and receive lines interconnect transmitters and receivers with the data bus and, receive lines from other hybrid lines are optically isolated by approximately 23 db from the receiver in the repeater by first and second mixers, isolation of the receiver from signals originating from other couplers preventing race conditions. Power equalization is inherent since signals from other couplers are received at nearly the same signal level as signals from local transmitters, repeater transmitter levels being adjustable for compensation for any small difference occurring due to coupler power splitting and line losses.

4 Claims, 12 Drawing Figures

OPTICAL REPEATER FOR USE IN ACTIVE MULTIPORT FIBER OPTIC DATA BUS COUPLER

This invention relates to optical transmission medium data bus couplers and more particularly to active multiport optical conductor data bus couplers.

Prior efforts to achieve an active fiber optic data bus have faced the common problem that by the very nature of the data bus a signal transmitted from any terminal gets distributed throughout the data bus distribution network. If a repeater is inserted at some point in the network, means must be provided for insuring that a repeaters receiver does not see its own transmission since positive feedback could occur with the repeater either oscillating or saturating. In either case the effect is to jam the bus. Since Fresnel reflections occur at all connector interfaces, it becomes easy to develop sneak paths from which positive feedback can result. Accordingly, it is an object in the successful use of repeaters in a data bus distribution network to provide a substantial amount of loss between a repeaters transmitter and its receiver.

The utilization of multiplex data buses in aircraft, ships and other vehicles provides for reduction in wiring and the achievement of additional systems flexibility. Fiber optic buses offer several advantages over conventional wire data buses. Large signal bandwidths and immunity to electromagnetic interference are well known properties of fiber optic cables. Further attributes include: freedom from disabling short circuits and intermittent connections; complete electrical isolation of interconnected systems; safety in explosive environments; light weight, and potential low cost.

Essentially all present serial data buses employ T couplers dispersed along a wire transmission line. This convenient prior art configuration imposes severe limitations on the fiber optic data bus. Series loss through many couplers limits the fiber optic data bus to few (10-15) terminals utilizing current state of the art technology. A prior configuration most commonly utilized in fiber optic data buses is the star configuration. In the star configuration, all fiber optic cables are brought together at a single point at which a signal from any one is distributed to all ports equally. Loss performance of the star coupler is close to optimum, but the resulting cable configuration is not convenient for aircraft or ship-board applications where equipment centers are widely separated or cable runs are severely restricted. A third configuration termed hybrid configuration provides for more convenient interconnection by the strategic location of a multiport coupler in each main equipment center and by interconnection of couplers with a single harness. However, the loss between terminals in the aforementioned hybrid configuration is at best 5 to 7 db greater than the loss in a star configuration having the same number of terminals.

It is believed that the above general understanding of the prior approaches will lead to a better understanding and appreciation of the hereinafter described embodiments of the present invention. More specific examples of prior art include: U.S. Pat. No.'s 3,936,141, and 3,883,217 which however do not relate to couplers utilizing active elements; and, U.S. Pat. No. 4,027,153 which in FIG. 1A has not treated the problem of positive feedback which can result in oscillations or a continuous "on" condition, which problem is addressed hereinafter in connection with the description relating to figures of the drawings representative of embodiments of the present invention.

It is accordingly an object of the present invention to: with the constraint of having a completely passive bus (no repeaters) removed, provide a data bus distribution network which provides the convenient interconnection capability of the hybrid configuration while maintaining an effective loss between terminals that is lower than the star configuration.

Briefly, in accordance with a preferred embodiment of the present invention, an active multiport fiber optic data bus coupler is provided in which selected incoming signals are otpically isolated from the receiver of an associated repeater. More particularly, the present system embodiment comprises a first mixer which accepts inputs from a plurality of local transmitters and divides its output into a first portion that is supplied to an active receiver with its associated repeaters, and a second portion that is supplied to a second mixer which also accepts inputs from other couplers and combines the signals for outputting to a plurality of local receivers.

Further description of these and other novel features of the invention and its principles of operation and of additional examples thereof will be presented below in connection with a discussion of the accompanying drawings given by way of example and in which:

Figure 1:
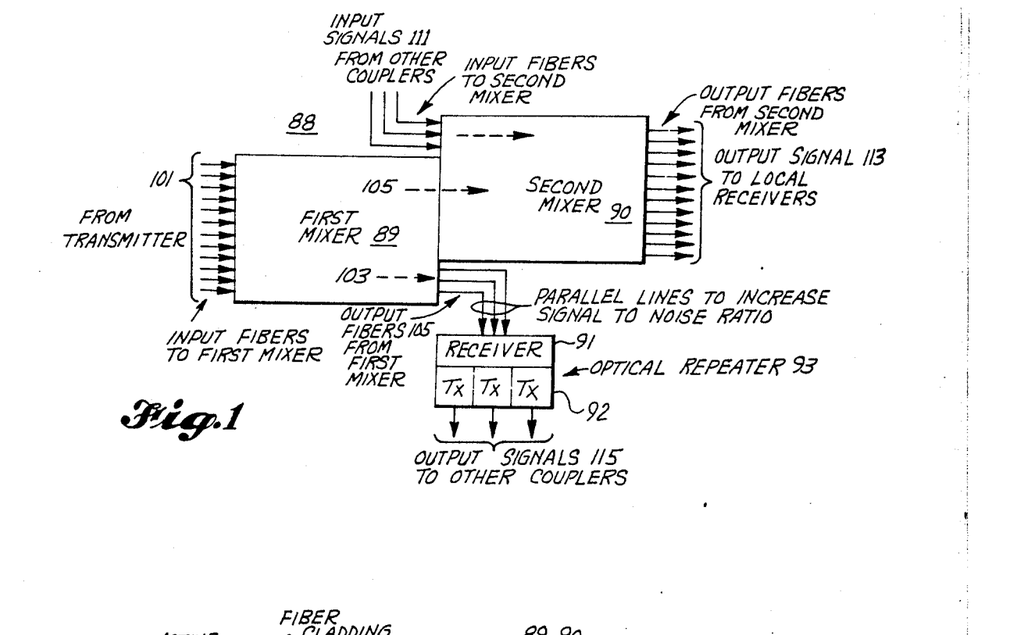
FIG. 1 is a schematic diagram of an active multiport coupler utilizing an optical repeater in accordance with an embodiment of the present invention.
Figure 4:
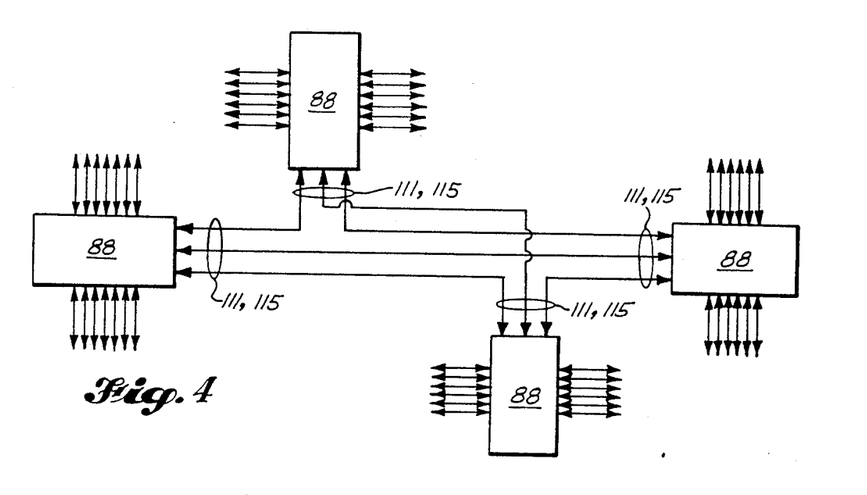
FIG. 4 is a block diagram illustrative of a 48 terminal hybrid configured data bus utilizing four of the 12 terminal active multiport fiber optic data bus couplers of the type shown in FIG. 1.
Figure 5:
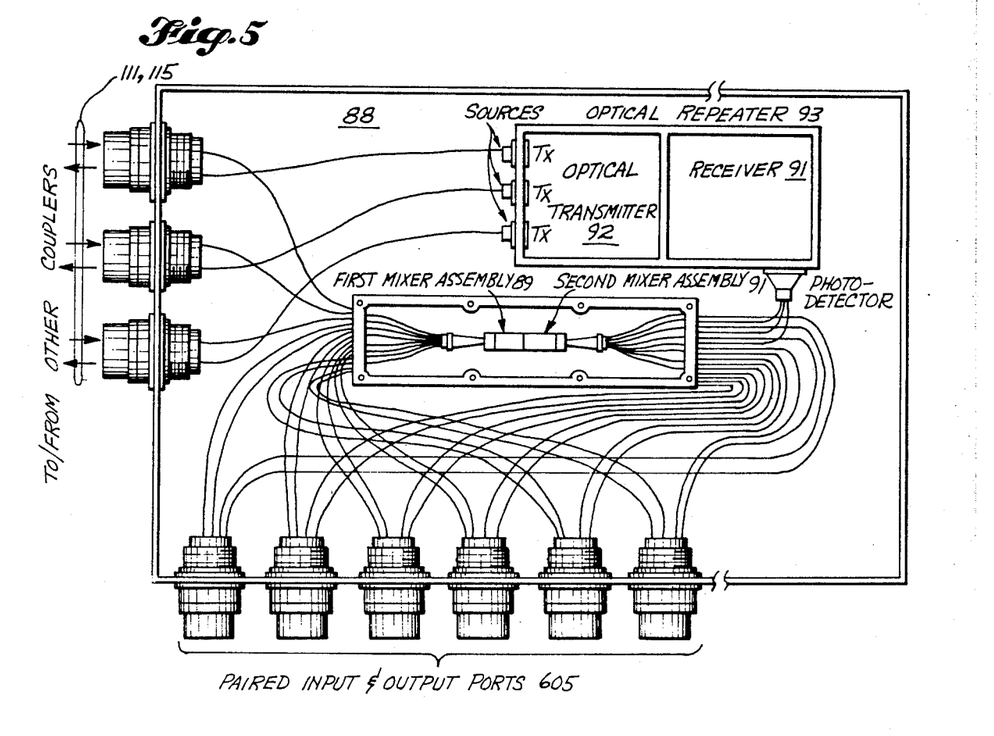
FIG. 5 is illustrative of the connector arrangements utilized in the active multiport fiber optic data bus coupler of FIG. 1 and couplers of the data bus of FIG. 2.

Turning now to active multiport fiber optic data bus coupler 88 of FIG. 1 (and FIG. 5 showing a connectorized version of FIG. 1) it will be observed that selected input signals 111 (three are shown) are optically isolated from receiver 91 of optical repeater 93. More particularly, active multiport fiber optic data bus coupler 88 comprises first mixer 89 which is responsive to a plurality of input signals 101 from a plurality of local transmitters (not shown) and divides its output into first output signals 103 via output fibers 105 (shown in FIG. 1 as parallel lines so as to increase the signal to noise ratio) to receiver 91 of optical repeater 93, and second output signals 105 coupled to provide input signals to second mixer 90. Second mixer 90 is also responsive to input signals 111 from other couplers (not shown) combining these signals and providing output signals 113 via output fibers from second mixer 90 to local receivers (not shown). Optical transmitter 92 (seen in more detail in FIG. 5 to include a plurality of signal sources denoted $T_x$) output signals 115 are transmitted to other couplers 88 (not shown in FIG. 1 but shown in the data bus arrangement of FIG. 4).

In summary, briefly returning now to FIG. 1 and coupler 88 utilizing optical repeater 93, it will be seen in the embodiment shown that twelve input signals 101 and twelve output signals 113 on individual lines are paired (in the form of two channel cables as shown in FIG. 4) to interconnect transmitters and receivers with the data bus and also to interconnect the couplers (as 6 pairs of dedicated transmit and receive lines represented in FIG. 4 by leads with double arrowheads). Coupler 88 distributes signals from local transmitters and also incoming signals from other couplers to the local receivers. A portion 105 of the signal from local transmitters is tapped off to optical repeater 93, which boosts the signal level prior to transmission to other couplers. An important feature of the present system is that optical transmission lines carrying incoming signals from other couplers are optically isolated (by about 23 db optical) from receiver 91 of optical repeater 93 by first and second mixers 89 and 90. In coupler 88 of FIG. 1, signals 111 from other couplers are coupled as inputs to second mixer 90 downstream from output signals 103 coupled as inputs to optical repeater 93. Isolation of receiver 91 from signals originating from other couplers is essential in avoiding race conditions. Preliminary calculations indicated that the desired signal (to be repeated) to undesired signal (not to be repeated) of an optical 21 db would result from this configuration which is more than sufficient for high quality reception and the prevention of race conditions. Power equalization is inherent in this embodiment since signals from other couplers are received at nearly the same signal level as signals from local transmitters, any small difference occurring due to coupler power splitting and line losses being easily compensated for by adjustment of repeater transmitter levels.

Figure 2:
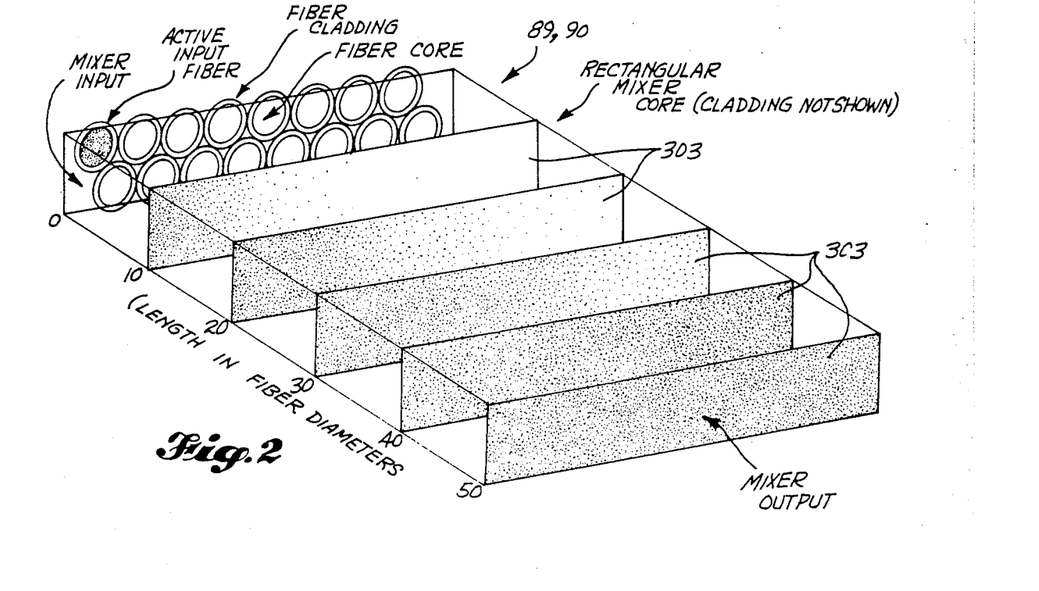
FIG. 2 is a perspective view of an optical mixer suitable for use in the active multiport coupler of FIG. 1.

Optical mixers 89 and 90 are optical waveguides whose function is to accept optical power at any point on their input and distribute it uniformly over their output and may comprise an exemplary component such as shown in FIG. 2 (with appropriate legends shown for clarity). Optical mixers 89 and 90 include a core of optically conducting material surrounded over their lengths by a material having a lower index of refraction than the core material so that light entering the mixers input is substantially completely reflected off the sides. The shape of the mixer is an important factor in determining the degree of uniformity that power is distributed over the mixers output. For example, skew rays injected into cylindrical type mixers (not shown) tend to follow helical paths which never pass through the center of the mixer. Mixers having rectangular cross sections (such as shown in FIG. 2) do not have the skew-ray problem and give better uniformity. In the rectangular cross section mixer of FIG. 2, distribution of rays plotted at intervals along the length of the mixer is illustrated, the number of rays at each rectangular cross section 303 has been adjusted to give good visual contrast so that FIG. 2 can illustrate how optical power from any one of the input fibers can be divided equally between all of a multiplicity of output fibers.

Figure 3A:
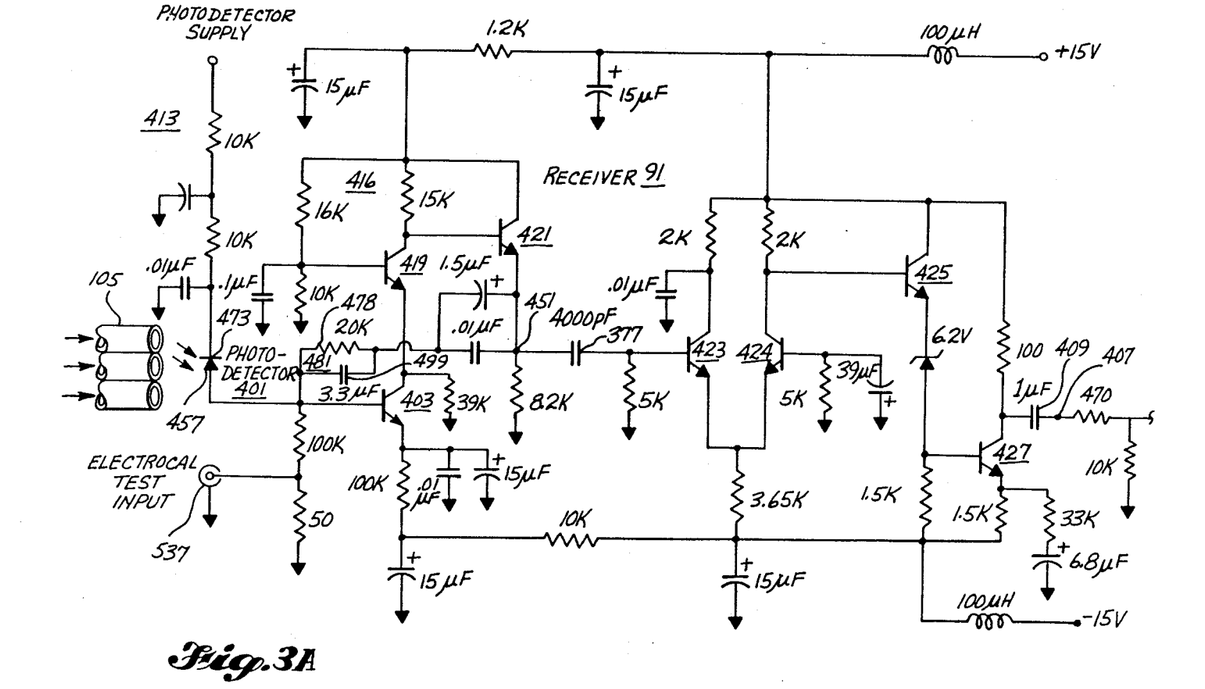
FIGS. 3A and 3B when placed side by side are illustrative of the schematic for the optical repeater shown in FIG. 1.
Figure 3B:
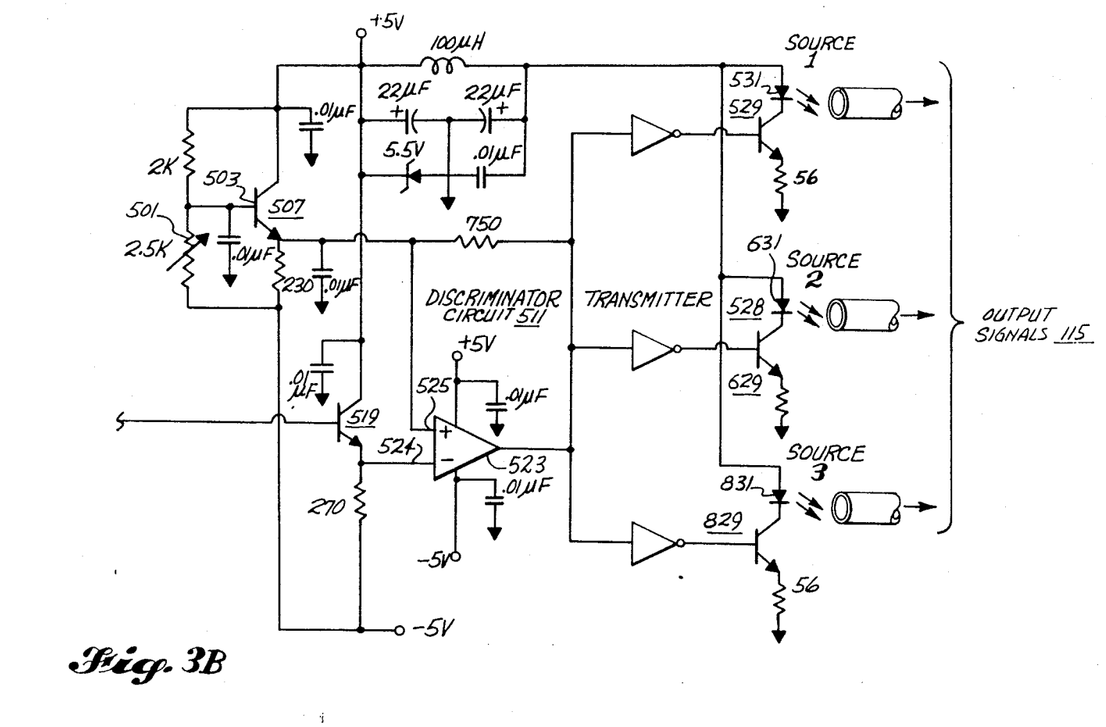

Optical repeater 93 of FIG. 1 is shown in detailed schematic form in FIGS. 3A and B and generally comprises means for detecting a low level optical signal, amplifying the signal, discriminating between signals to be repeated (or regenerated) undesired noise or other signals, and generation of the desired data bus waveform optical output signal or signals.

More specifically, optical repeater 93 includes input device 401 comprising a photo detector connected in series circuit with the base electrode of low noise transistor 403 (a type 2N 3117). Output fibers 105 from first mixer 89 (shown in FIG. 1) provide the input to photo detector 401. All three of fibers 105 carry the same signal and three however are used since the combined power will result in a higher signal-to-noise ratio at receiver 91 output which is provided at terminal 407 of a.c. coupling capacitor 409. Photodetector 401 comprises either a PIN photodiode or an avalanche photodiode. Photodetector 401 is reversed biased by photodetector power supply 413 which is connected to first electrode 473 of photodetector 401. Light entering photodetector 401 results in a small photocurrent which is first amplified by cascode amplifier circuit 416 which includes low noise first transistor 403 and second and third transistors 419 and 421, and further amplified by transistors 423, 424, 425, and 427 of receiver circuit 91. Cascode amplifier circuit 416 includes an output terminal 451 which is connected through feedback network 481 (including parallel connected resistor 478 and capacitor 499) to second electrode 457 of photodetector 401. Receiver circuit 91 is a.c. coupled through capacitor 377 connected in series circuit with output terminal 451 of cascode amplifier circuit 416 and capacitor 409 connected in series circuit path with output terminal 407 of receiver circuit 91, which a.c. coupling prevents drift problems associated with temperature variations which normally would occur in d.c. coupled amplifiers. Series connected capacitor 409 is also utilized to provide base line adjustment of the received signal by injection of droop in the waveform. Variable resistor 501 connected to base electrode 503 of second emitter follower stage 507 of discriminator circuit 511 provides means for varying the detection threshold voltage. First emitter follower stage 519 and aforementioned second emitter follower stage 507 introduce the same voltage offset to both the signal and the threshold thereby providing a low impedance to comparator 523 inputs 524 and 525 in discriminator circuit 511. When the signal voltage exceeds the threshold voltage, comparator 523 provides a low level output and transmitter 528 driver circuits 529, 629, and 829 switch to an "on" condition respective light emitting diodes 531, 631, and 831 thereby providing corresponding output optical signals 115 as inputs to second mixers of other couplers (not shown). Electrical test input terminal 537 provides a useful feature in permitting adjustment via variable resistor 501 (hereinbefore discussed) and setting of the optical repeater detection threshold. Preferably, the threshold should be set high enough that signals 111 from other couplers (as seen in FIG. 1) via input fibers to second mixer 90 and multiple reflections within the coupler are rejected, and low enough that the lowest level signals anticipated from local transmitters (signals 101 in FIG. 1) are repeated without error.

Turning now to FIG. 4, a 48 terminal data bus comprising four active multiport fiber optic data bus couplers 88 is seen wherein paired transmitter output 115 and signals from other couplers 111 are seen coupled between couplers 88. A more detailed schematic version showing detailed internal coupler 88 connections is shown in FIG. 5 while FIG. 1 and the aforementioned detailed description in connection therewith may be referred to for a complete understanding of the operation of optical repeater 93, first, and second mixers 89 and 90.

In the interest of consistency between FIGS. 4 and 5, it should be observed that in FIG. 4, 12 paired input and output ports (each represented by a line with paired arrowheads) for each coupler 88 are shown, while in FIG. 5 the number of connectors 605 is only six since four lines or two pairs are brought out to each of connectors 605 coupled by optical fibers (not shown) to and from local receivers and transmitters.

Figure 6:
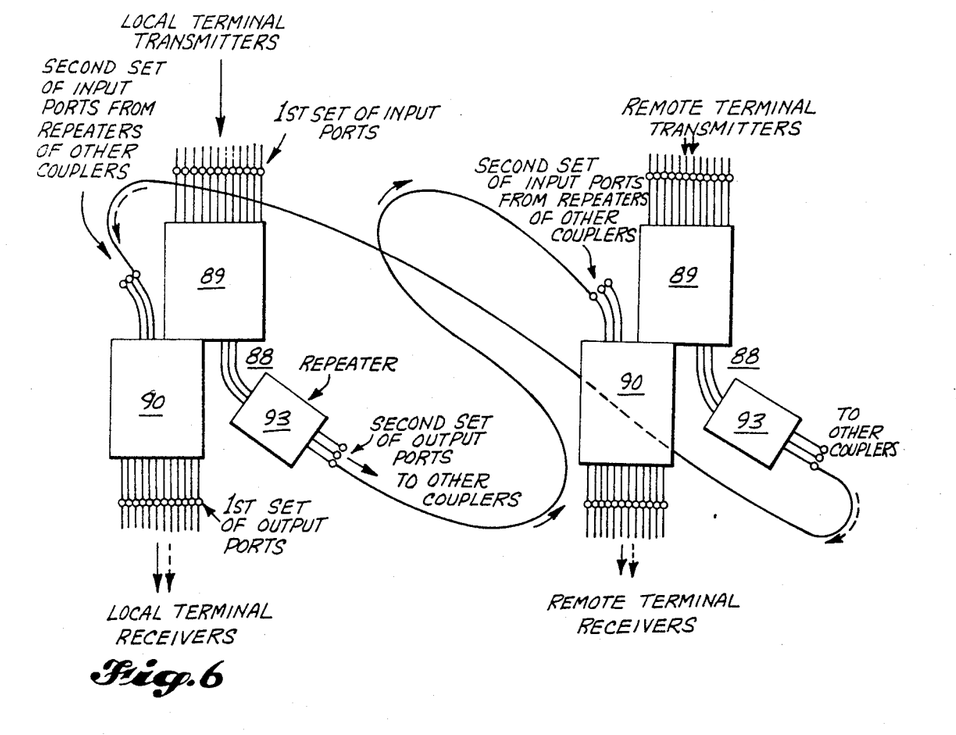
FIG. 6 is illustrative of signal paths to and from and between a pair of the present active data bus couplers.

A further figure, FIG. 6, has been included and leading to a further understanding of the present invention since giving in detail legends denoting all incoming and outgoing signals and signal paths intermediate a pair of couplers 88 of a data bus.

Figure 7:
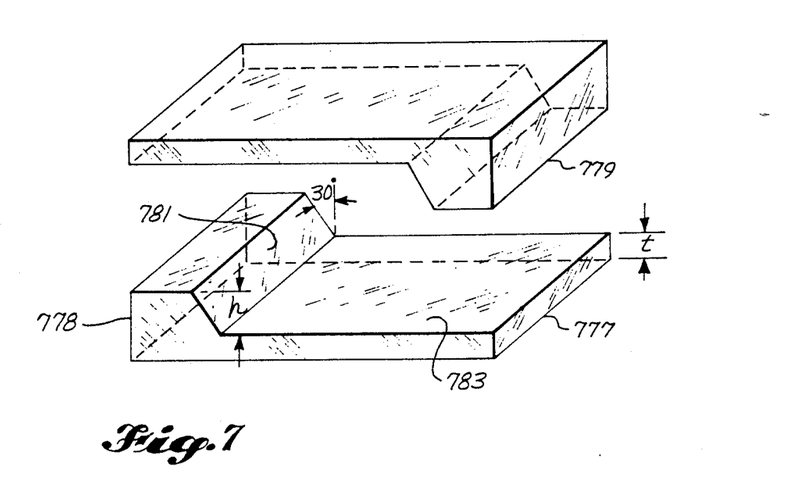
FIG. 7 shows fixtures utilized in a method of making fiber and mixer assemblies.
Figure 8:
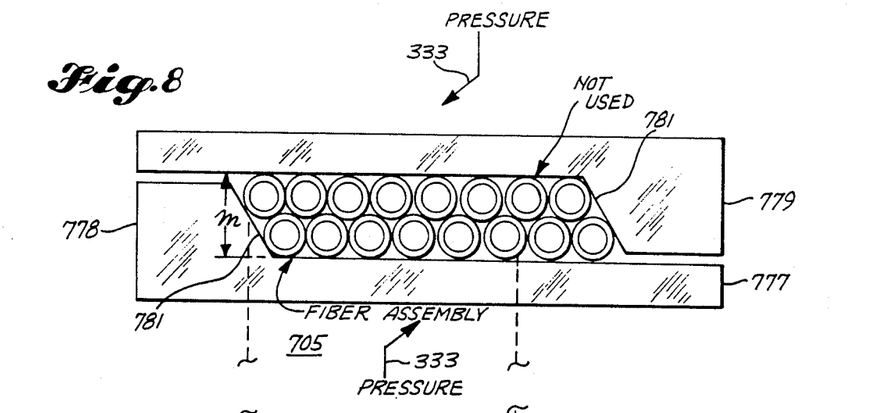
FIG. 8 is illustrative of fiber assembly manufacture.

FIGS. 7, 8, 9, 10 and 11 have been included since exemplary of a method of making active couplers 88 having certain unique features and advantages hereinafter described. FIG. 7 shows a pair of identically shaped fixtures comprising top fixture 779 and bottom fixture 777 which are utilized to position, retain, and align the several elements of coupler 89 (seen in FIG. 10 as including a pair of fiber assemblies 705 and first and second mixer fiber assemblies 707 and 707). Top fixture 779 and bottom fixture 777 are generally L shaped with the bottom foot (short leg) 778 of the L having a step height h less than the thickness m (seen in FIG. 8) of the fiber or mixer array to be confined so that the tightest fit (no extra space between the fibers) is achieved. The inner surface 781 of foot 778 is cut in at 30 degrees so that the inner surface or top 781 of foot 778 forms an angle of 120 degrees with respect to the back surface 783 of bottom fixture 777. Bottom fixture 777 and top fixture 779 comprise a transparent material, e.g., precision molded plastic or glass drawn from a preform so that subsequent to sandwich assembly of fixtures 777 and 779 about the fiber array (as shown in FIG. 8), viewing can be had during final assembly. The dimension t (thickness of the long side of L shaped fixture 777) is critical in terms of providing for vertical alignment of mixer and fiber assemblies with respect to baseplate 931 (as seen in final coupler assembly in FIG. 10). Optical mixer fiber assembly 89 or 90 shown in FIG. 9 comprises a glass core portion 989 surrounded by a layer of cladding material 981 (of lower index of refraction).

Figure 9:
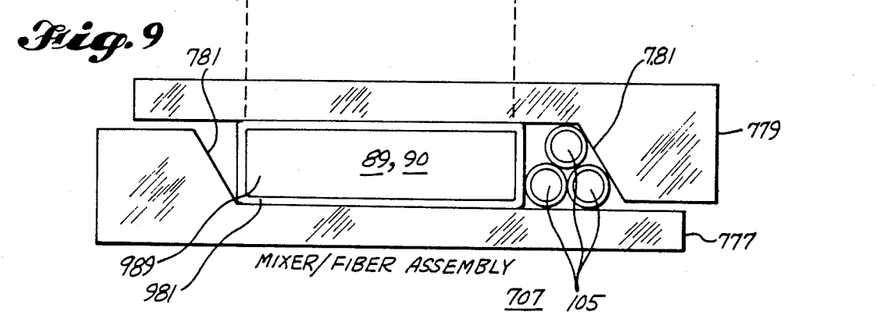
FIG. 9 is illustrative of mixer assembly manufacture.

Fiber assembly 705 is formed as shown in FIG. 8 by first disposing the two-layer fiber array shown between top and bottom fixtures 779 and 777 and then compressing the two layer fiber array by pressure against fixtures 777 and 779 in an inward direction towards the plane of the fiber array with subsequent second step inward pressure then applied (as represented by arrows 333) in a direction perpendiclar to inner surface 781 of feet 778 and 779 with the subsequent curing of the two layer epoxy potted array for permanent retention thereof. Grinding and polishing of the end faces of the two layer fiber array completes the method of making fiber assemblies 705 later utilized in the final composite coupler assembly of FIG. 10. Mixer 89, assembly is shown in FIG. 9 similarly utilizing the aforementioned method and top and bottom L-shaped fixtures 779 and 777.

Figure 10:
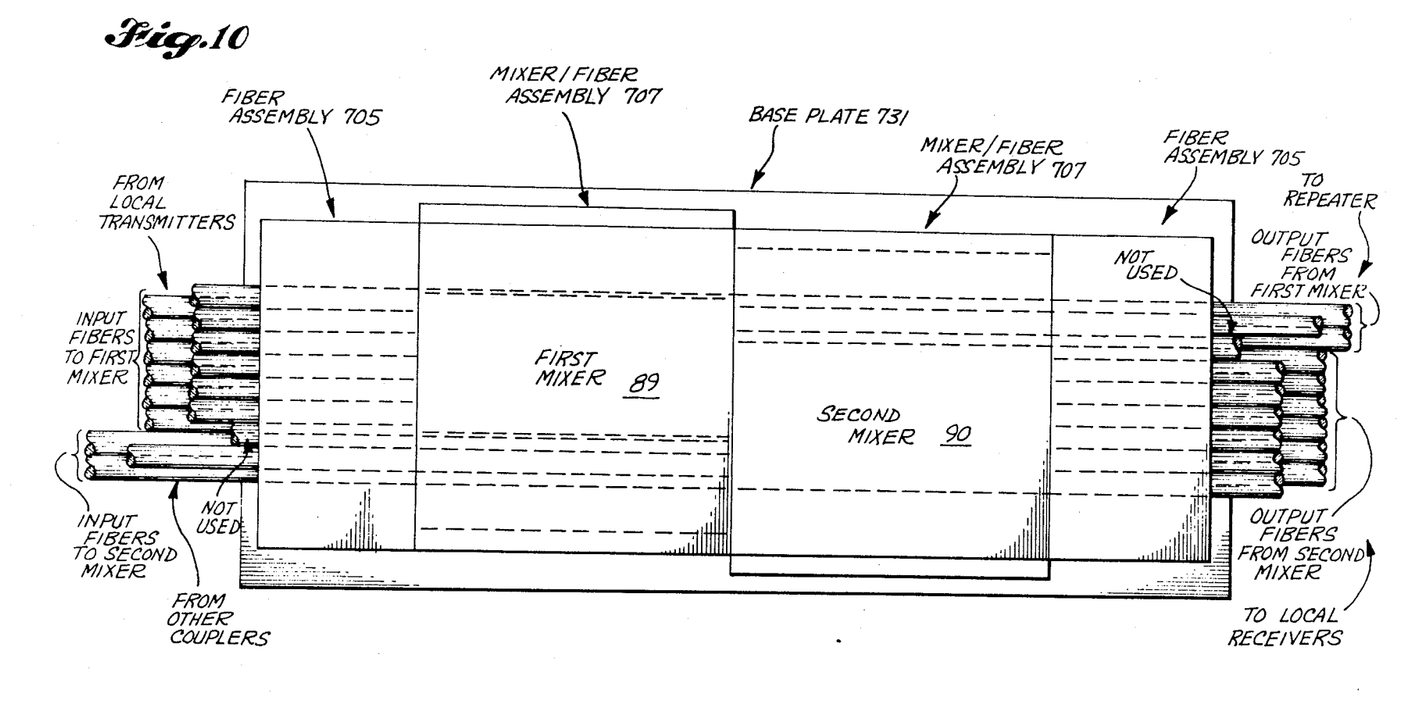
FIG. 10 is illustrative of coupler assembly manufacture.
Figure 11:
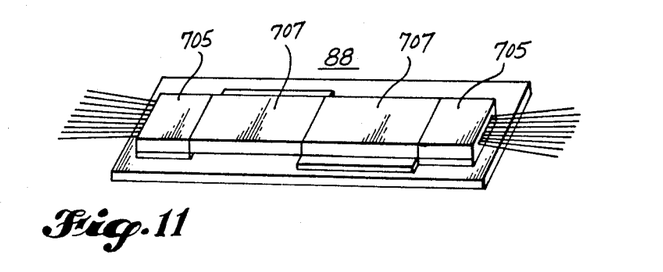
FIG. 11 is a perspective view of final coupler assembly.

Final assembly of active coupler 88 is shown (top view) in FIG. 10 and (in perspective) in FIG. 11. As observed, two mixer fiber assemblies 89 and 90 and two fiber assemblies 705 are aligned to form the final assembly. Vertical alignment is achieved by assembling two of elements 705 and elements 89 and 90 on common base plate 931. Lateral alignment is achieved by visual observation of the aforementioned elements through transparent positioning fixtures. Elements of the final assembly forming active coupler 88 are permanently secured in an integral structure by an optical grade epoxy (not shown for clarity) to avoid loss and minimize Fresnel reflections at junctions between elements.

We claim:

1. An optical repeater for use in an active multiport fiber optic data bus coupler, said optical repeater comprising:
    a receiver circuit including means responsive to a plurality of identical optical signals coupled through photodetector means to a cascode amplifier circuit;
    a transmitter circuit; and
    a discriminator circuit coupled between said receiver circuit and said transmitter circuit.

2. The invention of claim 1 wherein said discriminator circuit includes comparator circuit means.

3. The invention of claim 1 wherein said receiver circuit is a.c. coupled through series coupling of a capacitor in series circuit path with the output terminal of said receiver circuit for providing base line adjustment of the received signal.

4. The invention according to claim 1 including means connected in said discriminator circuit for providing a variable detection threshold voltage.

* * * * *